United States Patent [19]

Permentier et al.

[11] Patent Number: 5,929,174
[45] Date of Patent: Jul. 27, 1999

[54] IONOMER COMPOSITIONS, PROCESSES FOR THEIR PREPARATION, USES AND CONVERSION PROCESSES THEREFOR

[75] Inventors: Dirk Jozef Celeste Permentier, Meerbeke, Belgium; Tengku Mahamut, Selangor, Malaysia

[73] Assignee: Exxon Chemical Patents, Inc., Houston, Tex.

[21] Appl. No.: 08/822,385

[22] Filed: Mar. 20, 1997

Related U.S. Application Data

[63] Continuation of application No. 08/362,484, Feb. 13, 1995, abandoned.

[30] Foreign Application Priority Data

Jul. 1, 1993 [WO] WIPO .................. PCT/EP93/01712

[51] Int. Cl.$^6$ ...................................... C08F 08/42

[52] U.S. Cl. .................. 525/330.2; 525/361; 525/362

[58] Field of Search ................... 525/330.2, 361, 525/362

[56] References Cited

U.S. PATENT DOCUMENTS 5,298,571  3/1994  Statz et al. ..................... 525/330.2

*Primary Examiner*—Bernard Lipman
*Attorney, Agent, or Firm*—Douglas W. Miller

[57] ABSTRACT

The invention concerns a polymer derived from ethylene and at least 5 wt % of acrylic acid neutralised by a divalent cation (D) and a monovalent cation (M) at a mol ratio D/(D+M) of from 0.3 to 0.8 with at least 23 mol % of the acrylic acid derived acid groups neutralised by the divalent cation so as to provide a melt index uplift of at least 250%.

14 Claims, 2 Drawing Sheets

IONOMER COMPOSITIONS, PROCESSES FOR THEIR PREPARATION, USES AND CONVERSION PROCESSES THEREFOR

This is a continuation of application Ser. No. 08/362,484, filed Feb. 13, 1995, now abandoned.

FIELD OF INVENTION

This invention relates to ionomer compositions, processes for their preparation, their uses and processes for converting these ionomers.

BACKGROUND OF THE INVENTION

Ionomer compositions may be made by blending individual polymer materials. The blending can give new property combinations. Ionomer compositions obtained by the blending of an ionomer with other polymers have found applications in different areas e.g. heat seal compositions (see for example EP 94 991) and toughened polyamide combinations (see for example U.S. Pat. No. 4,078,014).

Packaging materials using blends involving ionomers are disclosed in JP 3092-340-A and JP 8205765-A. Golf ball related prior art includes U.S. Pat. No. 4,274,637; JP 1207-343-A; US 4,323,247; GB 2134799A; WO 87/02039-A; AU 8930892A=U.S. Pat. No. 4,990,574; JP 600905756A and U.S. Pat. No. 4,984,804.

U.S. Pat. No. 3,819,768 discloses a golf ball cover derived from 90 to 10 percent of an ionic copolymer of an unsaturated monocarboxylic acid and from 10 to 90 percent of an ionic copolymer of an olefin and a zinc salt of an unsaturated monocarboxylic acid. All Examples use blends of Surlyn (Registered Trade Mark) which are ethylene-methacrylic acid copolymers.

JP-1987 - 63468 discloses a mixed ion golfball blend having low degrees of neutralisation by divalent cations and high melt index precursors.

U.S. Pat. No. 4,911,451 discloses analogous blends but using ethylene-acrylic acid copolymers. The sodium ionomer is derived from a copolymer which contains 11 wt % of acrylic acid and is neutralised to about 40%. The zinc ionomer is derived from a copolymer having from 11 to 16% of acrylic acid neutralised to an extent of from 10 to 40%. A series of Escor (Registered Trade Mark) materials are used which have an appropriate melt index. The overall degree of neutralisation provided by zinc is less than 23%. No extrusion process is disclosed. EP 443 706 also discloses blends of ethylene-acrylic acid ionomers made using cations of both sodium and zinc. The total neutralisation degree is from 30 to 60%, with at least 10 wt % neutralised by divalent metal ions. In EP 443 706 the melt index of the cross-linked ionomer is from 0.5 to 5.0 g/10 min. Before neutralisation the precursor has a melt index of from 20 to 150 g/10 min. Neutralisation with individual ions is also specified at from 20 to 70% of the carboxyl groups with alkali metal ions. For the ionomer neutralised with a divalent metal ion, the neutralisation is from 25 to 70 mol % of the carboxyl groups. A broad range of blend ratios (from 80/20 to 30/70) is disclosed. Stiffness is also stated to be a significant performance parameter. The zinc/total cation ratio in the Examples does not exceed 0.3 for EAA ionomer blends. No extrusion process is disclosed.

U.S. Pat. No. 5,120,791 also discloses ionomer blends. Examples 6, 20 and 23 blends EAA or E-MA-AA ionomers which are significantly neutralised. No mention is made of the existence of or the extent of a melt index uplift. The degree of neutralisation is fairly low. The precursor melt index is fairly high.

Ionomers are sensitive to moisture levels. If these are too high an increase in melt index may result which is generally indicative of a deterioration in ionomer quality which may lead to surface defects such as bubble formation in for example films.

In the use of ionomers, the melt index of the unneutralised precursor influences the processability of the neutralised ionomer. Too high a molecular weight and the processability may be restricted. For good processability, lower molecular weight precursor may have to be used even though these are otherwise less desirable.

It has now been found that a significant increase in Melt Index (expressed herein in terms of the "Melt index uplift") may result for an ionomer, which increase goes beyond that normally deemed possible with either divalent or monovalent neutralising cations, by using a combination of monovalent and divalent cations at given ranges of cation ratios and neutralisation degrees. The melt index uplift can be used to improve processability forgiven levels of cross-linking in ionomer or to work with higher molecular weight precursors or work with higher cation levels whilst maintaining processability and so provide improved properties.

The MI uplift is not attributable to water content.

SUMMARY OF INVENTION

The invention firstly provides an ionomer composition comprising a polymer derived from ethylene and at least 5 wt % of acrylic acid neutralised by a divalent cation (D) and a monovalent cation (M) at a mol ratio D/(D+M) of from 0.3 to 0.8 with at least 23 mol % of the acrylic acid derived acid groups neutralised by the divalent cation so as to provide a melt index uplift of at least 250%, preferably at least 300%.

The prior art does not teach neutralisation degrees or MI uplift at these levels.

Preferably the same polymer neutralised to an equivalent extent by either the monovalent cation or the divalent cation may have a melt index in excess of 0.7. With the medium to lower molecular weight materials considerable values of MI uplift can be achieved.

The invention secondly provides an ionomer composition comprising a polymer derived from ethylene and at least 5 wt % of acrylic acid neutralised by a divalent cation (D) and a monovalent cation (M) at a mol ratio D/(D+M) of from 0.1 to 0.9 with at least 10 mol % of the acrylic acid derived acid group neutralised by the divalent cation, the equivalent polymer of that melt index and comonomer content neutralised to an equivalent extent by the monovalent cation alone or the equivalent polymer neutralised to an equivalent extent by the divalent cation alone having a melt index of less than 0.7 preferably less than 0.5 so as to provide a melt index uplift of at least 150%. Neutralisation to an equivalent extent occurs when the wt % of cation (either the monovalent or divalent) is that of the sum of the weight percentages of the monovalent and the divalent cation in the composition present in the polymer of the composition of the invention. It is sufficient for the purpose of the invention if either the equivalent polymer neutralised by the monovalent cation or the equivalent polymer neutralised by the divalent cation is below the limiting melt index, although of course also both may be below. It has not previously been known to use such highly cross-linked acid copolymers to produce ionomers having good processing characteristics.

In either the first or the second aspect of the invention the unneutralised precursors of the respectively neutralised polymers may differ in melt index suitably to an extent of at least 150 g/10 min. Preferably the higher melt index component is neutralised predominantly by the monovalent cation. It has not been known previously to use small amounts of high MI sodium ionomer to provide good physical characteristics in processing and for impact strength.

All of these previously disclosed compositions enjoy the benefit of a considerable melt index uplift which permits higher molecular weight precursors to be converted into processable ionomers than would otherwise be the case and/or extend processability and physical characteristics.

The melt index uplift is defined by the formula (1):

$$MI \text{ uplift} = \left[ \frac{MI_{ionomer}}{10 \wedge [(wfract_{Mo} * \log(MI_{Mo})) + (wfract_{Di} * \log(MI_{Di}))]} \times 100 \right]$$

wherein $MI_{ionomer}$ is determined according to ASTM-D2348 Condition E and wherein: $wfract_{Mo}$ is the weight fraction of M/(D+M); $wfract_{Di}$ is the weight fraction of D/(D+M) and $wfract_{Mo}$ and $wfract_{Di}$ are determined from the monovalent and divalent cation content. Without any uplift effect, the calculated value would be 100. The symbol ^ indicates the start of an exponential operator.

$MI_{Mo}$ is determined by deneutralising according to one of the established methods (e.g. J. Polym. Sci. Part A; Polym.Chem. Vol. 29 (1991) p 585–589); then determining the acrylic acid content using IR or NMR of the deneutralised polymer and then neutralising an equivalent polymer with an equivalent amount of the monovalent cation and measuring the MI.

$MI_{Di}$ is determined analogously.

$MI_{Mo}$ and $MI_{Di}$ can if appropriate be predicted from information on tests of equivalent polymer precursors.

Water content should be tested and be kept at the level below that described in commercial ionomer specifications (generally less than 500 ppm).

Because the MI uplift is a fundamental characteristic a full description of the method followed is given. The method includes the following steps:

1A. Determine the monovalent cation content W% (MS);
1B. Determine the divalent cation content $W\%_{Di}$ (AAS);
1C. Calculate $wfract_{Mo} = W\%_{mo}/(W\%_{mo}+W\%_{Di})$;
1D. Calculate of $wfract_{Di} = W\%_{Di}/(W\%_{mo}+W\%_{Di})$;
2A. Determine the $MI_{ionomer}$ of the ionomer composition;
2B. Determine the moisture content of the ionomer composition;
3. Demetallize metal salts according to one of the established methods (e.g. J.Polym.Sci. Part A: Polym.Chem.: Vol. 29 (1991), P 585–589);
4. Determine the Acrylic Acid content $AA\%_{Tot}$ (IR or NMR) of unneutralized copolymer;
5. Calculate the Neutralization degree $ND_{Di}$ for the divalent cation from & $W\%_{Di}$ and $AA\%_{Tot}$ in the event MAA is present, its percentage should be added to that of AA;
6. Determine the $MI_{precursor}$ of the unneutralized copolymer;
7. Calculate the molfraction divalent cation=$Molfr_{Di}$=mol divalent cation/(mol divalent cation+mol monovalent cation)
8. Calculate MI uplift:
   A. Attribute the monovalent cation to a monovalent 'base' ionomer in such a way that the w% used of this base ionomer is proportional to the weight fraction $wfract_{Mo}$ of this cation in the ionomer composition.
   B. Attribute the divalent cation to a divalent 'base' ionomer is such a way that the w% used of this base ionomer is proportional to the weight fraction $wfrac_{Di}$ of this cation in the ionomer composition.
   C. Calculate the amount of mono-($W\%_{Mo,Base}$) respective divalent cation ($W\%_{Div,Base}$) present in the 'base' mono- respective divalent cation containing base ionomers: $W\%_{Mo,Base}=W\%_{Di,Base}=W\%_{mo}+W\%_{Di}$;
   D. Determine the melt index $MI_{Mo}$ of the monovalent base ionomer by neutralisation of the unneutralised copolymer with the calculated amount of monovalent cation as determined in C;
   E. Determine the melt index $MI_{Di}$ of the divalent base ionomer by neutralization of the unneutralized copolymer with the calculated amount of divalent cation as determined in C;
   F. Calculate the MI uplift from the previously set out MI uplift formula (1). A worked out illustration is set out in the Examples.

The MI uplift can be calculated without deneutralisation if one has access to the as yet unneutralised precursors.

Some MI uplift may have occurred in the prior art using EAA precursor discussed previously but the uplift would have been low, barely detectable against variations which can be ascribed to moisture content. The invention permits the composition to be optimised by using the different ranges indicated to give a pronounced and hitherto unknown MI uplift.

DETAILED DESCRIPTION OF INVENTION

Figure 1:
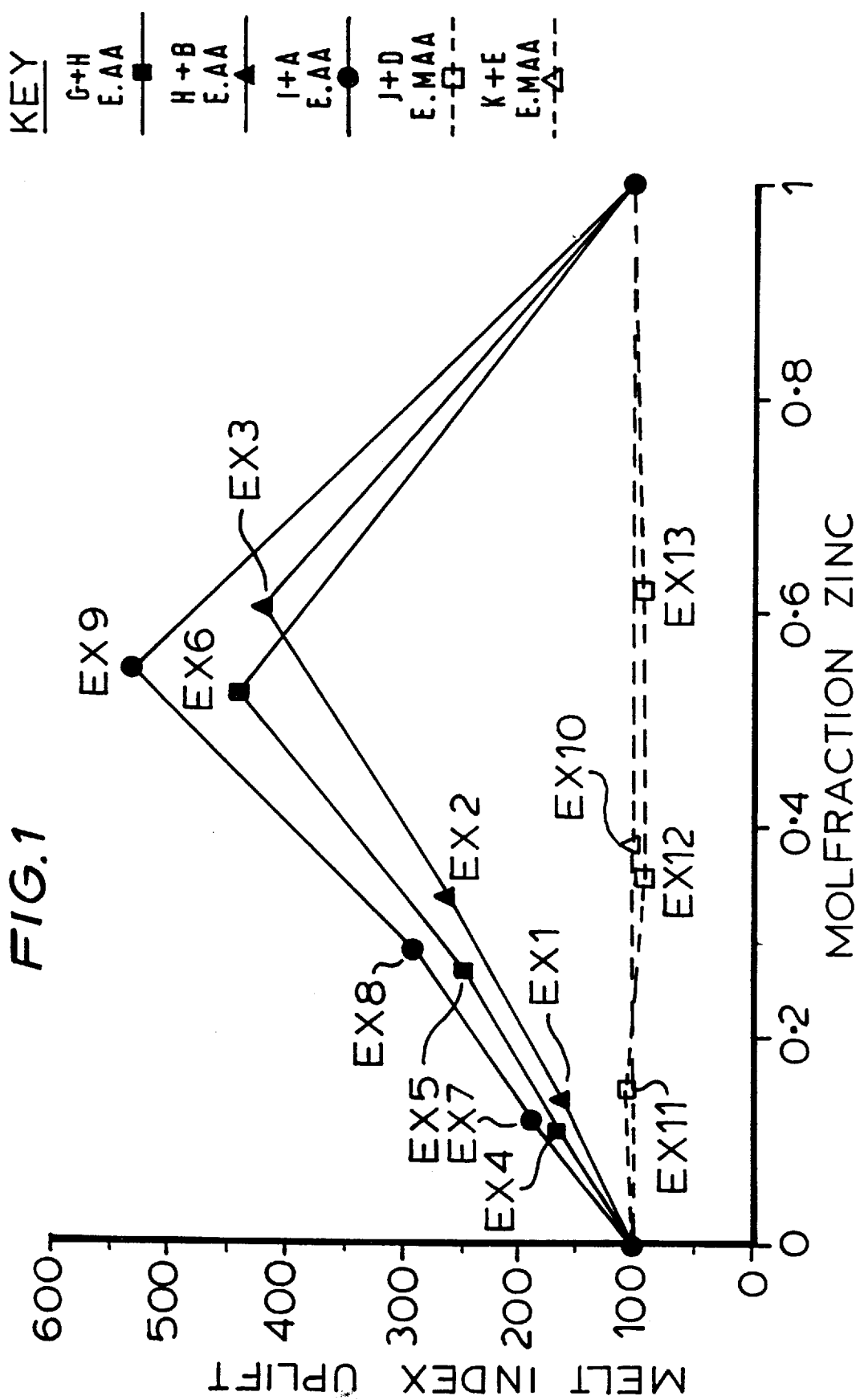

Preferred ionomers include those in which the divalent cation is zinc and the monovalent cation is sodium; the polymer is derived from at least 7.5, especially 10% of acrylic acid; the mol ratio D/(D+M) is from 0.4 to 0.7 and/or at least 25 wt % especially 30 mol % of the acrylic acid derived groups are neutralised by the divalent cation.

Preparation of acid copolymers is well known. A variety of neutralisation methods have been described. In principle all of the preparations and methods are applicable here. The precursor may contain units derived from monomers other than acrylic acid and ethylene.

The melt index of the composition is preferably at least 0.5 and preferably does not exceed 20. As to the precursor acid copolymer the melt index is preferably from 2 to 2000 especially from 5 to 200. In certain instances small amounts of higher melt index precursor material may be used together with larger amounts of lower melt index precursor material.

The composition may be prepared by blending two separately neutralised ionomers. It is also possible to add a monovalent or divalent cation to a previously prepared, partly neutralised ionomer incorporating one of the cations.

Preferably however at least one polymer component, after an optional blending step with another component, is neutralised in the same process step by the divalent cation and monovalent cation to provide the composition. The neutralising compounds may be fed in a blend or separately to the apparatus in which the process step is performed. For single precursors or when using different precursors, a dual cation neutralisation can be achieved in a single step without prior neutralisation. None of the prior suggest this direct and advantageous preparation route.

The MI uplift in itself constitutes a technical element which can be an integral part of a comonomer conversion process which the higher MI index permits better melt flow and so better processing or the application of thinner layers as the case may be in extrusion processes.

Thus the invention also provides an ionomer composition having a melt index uplift of at least 250%, especially preferably 300%, especially at least 350%, or even 400%, optionally with a neutralisation degree of at least 23%. Preferably the ionomer is derived from a polymer containing ethylene and acrylic acid derived units neutralised by a blend of monovalent and divalent cations so that the effect is utilised to a significant degree.

Particularly extrusion processes such as sealing, coating or lamination processes may benefit especially when performed at temperatures over 160° C. The resulting layers may furthermore display end-use characteristics of a highly advantageous nature, and for example good hot tack, may have high seal strength and low minimum sealing temperatures.

The invention thus finally provides a finished product in which the sealing layer is of the composition, preferably having a seal strength at 90° C. of at least 12 MPa.

The MI uplift depends on the use of EAA ionomer. EMAA ionomers do not show the uplift in the same way.

Examples of suitable monovalent cations are: Na+, K+, Li+, Cs+, Ag+, Hg+, Cu+. Examples of suitable multivalent di- and trivalent cations are: Be2+, Mg2+, Ca2+, Sr2+, Ba2+, Cu2+, Cd2+, Hg2+, Sn2+, Pb2+, Fe2+, Co2+, Ni2+, Mn2+, Zn2+, Al3+, Sc3+, Fe3+, Y3+. In the specification the term divalent also includes for convenience trivalent ions listed above.

The improved processability of the ionomer compositions of the invention is not limited to the low shear rates used when determining the Melt index, but is present at the complete shear rate range which can be covered by rheological equipment. Processability improvement may be achieved in many types of extrusion processes e.g. film blowing, film casting, pipe extrusion or injection moulding. For all these processes, the increased processability translates in reduction of torque, increased line speeds, lower cycle time and related economic benefits.

In the solid state the EAA based ionomers of the invention show the same or better property balances than can be achieved with conventional ionomers including improved abrasion resistance.

The major requirement of the invention is the simultaneous presence of multivalent (Zn) and monovalent (Na) cations in a EAA containing polymer mixture, whereby the mixing is sufficiently intense to provide homogeneous distribution of the cations. Other components for the ionomer compositions may be polymers such as terpolymers, ethylene copolymers, ethylene homopolymers, and various additives and stabilisers.

Additionally, as a result of the observed processability improvement of the blends, ionomer formulations can be made containing much higher levels of both zinc and sodium cations which still yield a blend melt index which allows a smooth processing of the ionomer material than achievable previously. Ionomers can be made with high degrees of neutralisation which nevertheless show a good balance of product properties and processability.

EXAMPLES

The following polymers were used for the Examples:

TABLE 1

Characterization of the Polymers Mentioned in the Examples

| Polymer Code | Precursor Type | Cation Type | Melt Index | Precursor MI | W % Cation | Total W % (M)AA |
|---|---|---|---|---|---|---|
| A | EAA | Zinc | 0.3 | 36 | 3 | 15 |
| B | EAA | Zinc | 0.8 | 36 | 2.3 | 15 |
| C | EAA | Zinc | 2.5 | 36 | 1.7 | 15 |
| D | EMAA | Zinc | 1.6 | 11 | 2 | 12 |
| E | EMAA | Zinc | 0.7 | 23 | 3.7 | 15 |
| F | EMA-AA* | Zinc | 0.8 | 20 | 2.0 | 6 |
| G | EAA | Sodium | 0.8 | 36 | 2.3 | 15 |
| H | EAA | Sodium | 2.8 | 36 | 1.65 | 15 |
| I | EAA | Sodium | 0.3 | 36 | 2.69 | 15 |
| J | EMAA | Sodium | 2.5 | 23 | 1.3 | 15 |
| K | EMAA | Sodium | 0.9 | 23 | 2.1 | 15 |
| L | EAA | Sodium | 1.4 | 1640 | 3.1 | 13 |
| M | EAA | None | 8 | 8 | 0 | 11 |

*20 wt % MA

Example 1–13

Combinations of the polymers were blended on a two roll mill, at a temperature of 160/170° C., at a roll speed of 60 rpm and a friction of +40%.

TABLE 2

| Example No. | A | B | D | E | G | H | I | J | K |
|---|---|---|---|---|---|---|---|---|---|
| 1 | | 25 | | | | 75 | | | |
| 2 | | 50 | | | | 50 | | | |
| 3 | | 75 | | | | 25 | | | |
| 4 | | 25 | | | 75 | | | | |
| 5 | | 50 | | | 50 | | | | |
| 6 | | 75 | | | 25 | | | | |
| 7 | 25 | | | | | | 75 | | |
| 8 | 50 | | | | | | 50 | | |
| 9 | 75 | | | | | | 25 | | |
| 10 | | | | 50 | | | | | 50 |
| 11 | | 25 | | | | | | 75 | |
| 12 | | 50 | | | | | | 50 | |
| 13 | | 75 | | | | | | 25 | |

The figures give the weight percentage of individual ionomer components used.

sulting Melt Index of the respective blends of these ionomers are shown in Table 3 and FIG. 1. Melt Indices are determined at 190° C. according to ASTM D 1238 Condition E.

TABLE 3

| Ex. No. | MI of Blend | % M AA | ND Zn | Molfr Zn | MI Uplift | wt % Zn Ionomer | Precursor Type | According to Claim |
|---|---|---|---|---|---|---|---|---|
| 1 | 3.3 | 15.0 | 8 | 0.14 | 161 | 25 | EAA | — |
| 2 | 3.9 | 15.5 | 17 | 0.33 | 261 | 50 | EAA | — |
| 3 | 4.6 | 15.0 | 25 | 0.60 | 420 | 75 | EAA | claim 1 |
| 4 | 1.31 | 15.0 | 8 | 0.11 | 164 | 25 | EAA | — |
| 5 | 1.97 | 15.0 | 17 | 0.26 | 246 | 50 | EAA | — |
| 6 | 3.52 | 15.0 | 25 | 0.52 | 440 | 75 | EAA | claim 1 |
| 7 | 0.62 | 15.0 | 11 | 0.12 | 186 | 25 | EAA | claim 5 |
| 8 | 1.01 | 15.0 | 22 | 0.28 | 290 | 50 | EAA | claim 5 |
| 9 | 1.93 | 15.0 | 33 | 0.54 | 530 | 75 | EAA | claim |

TABLE 3-continued

| Ex. No. | MI of Blend | % M AA | ND Zn | Molfr Zn | MI Uplift | wt % Zn Ionomer | Pre-cursor Type | According to Claim |
|---|---|---|---|---|---|---|---|---|
| 10 | 0.79 | 15.0 | 32 | 0.38 | 100 | 50 | EMAA | 1 + 5 — |
| 11 | 2.37 | 14.3 | 9 | 0.15 | 106 | 25 | EMAA | — |
| 12 | 1.8 | 13.5 | 19 | 0.35 | 90 | 50 | EMAA | — |
| 13 | 1.65 | 12.8 | 31 | 0.62 | 92 | 75 | EMAA | — |

FIG. 1 clearly shows the increase in MI when Na EAA based ionomers are mixed with Zinc EAA ionomers (Examples 1–10). Comparative examples blends 10–13 show that EMAA based ionomers do not show this unexpected behaviour. In the FIG. 1, the right hand column indicates the combination of precursors.

Table 4 gives a detailed overview of the calculation of the Melt Index uplift for Example 6.

TABLE 4

| Ref No. | | Example 6 |
|---|---|---|
| 1A | W % Na in composition | 0.58 |
| 1B | W % Zn in composition | 1.73 |
| 1C | W fraction Na in composition: | 0.251 |
| 1D | W fraction Zn in composition: | 0.749 |
| 2A | MI ionomer composition | 3.52 |
| 2B | Moisture of the ionomer composition | <500 ppm |
| 4 | Acrylic acid level (AA % tot) | 15.0 |
| 5 | Neutralization degree for Zinc (%) | 25.2 |
| 6 | MI Precursor | 36 |
| 7 | Molfraction Zinc | 0.51 |
| 8 | MI Uplift Determination: | |
| 8A | weight fraction of Na base ionomer | 0.251 |
| 8B | weight fraction of Zn base ionomer | 0.749 |
| 8C | w % Na in Na base ionomer | 2.31 |
| 8C | w % Zn in Zn base ionomer | 2.31 |
| 8D | MI Na base ionomer | 0.80 |
| 8E | MI Zn base ionomer | 0.81 |
| 8F | MI Uplift | 435 |

These data clearly show the very high Melt Index uplifts when Na EAA based ionomers are mixed with zinc EAA ionomers (Examples 3, 6, 9). Examples 1, 2, 4 and 5 show some Melt Index uplift but fall outside the boundaries of the present invention because of a low neutralisation degree and/or Zn mol fraction. Examples 7, 8 and 9 show the significant melt index uplift reached with ionomer compositions derived from low Melt Index Na and Zinc ionomers.

Comparative blends 10–13 show that EMAA based ionomers do not show any Melt index uplift at all. In the absence of any interaction the MI uplift would be in the region of 100 to 120 allowing for some moisture effect.

Example 14

On a two roll mill, at a temperature of 160–170° C., the following blends were made:

55 wt % of ionomer A with 30 wt % of ionomer G and 15 wt % of ionomer D.

The resulting blend has a melt index of 1.88 corresponding to a melt index uplift of 365%. The increase of melt index is independent from the source of zinc and sodium cation, and the melt index increase is preserved in the presence of EMAA ionomers in the blend.

Example 15

On a two roll mill, at a temperature of 160–170° C., following blend has been made:

30 wt % of ionomer G 30 wt % of ionomer C 40 wt % of ionomer F

The resulting blend has a melt index of 3.61, corresponding to a melt index uplift of 321%, demonstrating that the presence of a EMA AA terpolymer (ionomer) does not influence the increase in melt index.

Example 16 A, B and C

On a two roll mill, at a temperature of 160–170° C., the following blends have been made:

| Blend No. | Ionomer A | Ionomer C | Ionomer L |
|---|---|---|---|
| 16 A | 55 w % | / | 15 w % |
| 16 B | 75 w % | / | 23 w % |
| 16 C | / | 95 w % | 5 w % |

The characteristics of these blends with a low molecular weight components are summarised in Table 5.

TABLE 5

| Determination of MI | | Blend Uplift for Examples | Blend 16A | Blend 16B | 16C |
|---|---|---|---|---|---|
| 1A | w % Na in composition | 0.47 | 0.78 | 0.16 | |
| 1B | w % Zn in composition | 2.55 | 2.25 | 1.71 | |
| 1C | w fraction Na in composition | 0.156 | 0.257 | 0.086 | |
| 1D | w fraction Zn in composition | 0.844 | 0.743 | 0.914 | |
| 2A | MI ionomer composition | 2.66 | 2.72 | 6.21 | |
| 2B | Moisture level of ionomer composition | <500 ppm | | | |
| 4 | Acrylic acid level (AA % tot) | 14.7 | 14.5 | 14.9 | |
| 5 | Neutralization degree for Zinc (%) | 37.6 | 33.7 | 24.9 | |
| 6 | MI Precursor | 64 | 94 | 43.5 | |
| 7 | Molfraction Zinc | 0.66 | 0.51 | 0.79 | |
| 8 | MI Uplift Determination: | | | | |
| 8A | weight fraction of Na base ionomer | 0.156 | 0.257 | 0.086 | |
| 8B | weight fraction of Zn base ionomer | 0.844 | 0.743 | 0.914 | |
| 8C | w % Na in Na base ionomer | 3.020 | 3.030 | 1.870 | |
| 8C | w % Zn in Zn base ionomer | 3.020 | 3.030 | 1.870 | |
| 8D | MI Na base ionomer | 0.07 | 0.09 | 0.61 | |
| 8E | MI Zn base ionomer | 0.59 | 0.86 | 2.40 | |
| 8F | MI Uplift | 632 | 560 | 291 | |

Example 17

In Table 6, the viscosity data of Example 6 are compared with Example 13. This indicates that the viscosity decrease is not limited to the low shear rates associated with melt index measurements, but occurs also at high shear rates. The effect is prominent not only at the temperature used during the melt index determination, but also at more elevated temperatures as 230° C. and 270° C.

TABLE 6

| Apparent Shear Rate | Apparent viscosity (PA.sec) | | | | | |
|---|---|---|---|---|---|---|
| | 190° C. | | 230° C. | | 270° C. | |
| (1/sec) | Ex. 6 | Ex. 13 | Ex. 6 | Ex. 13 | Ex. 6 | Ex. 13 |
| 20 | 1593 | 2328 | 572 | 858 | 143 | 409 |
| 40 | 1262 | 1792 | 478 | 723 | 193 | 336 |
| 60 | 1082 | 1497 | 422 | 620 | 183 | 300 |
| 80 | 965 | 1327 | 388 | 556 | 173 | 276 |
| 100 | 879 | 1201 | 358 | 513 | 163 | 252 |
| 170 | 704 | 939 | 297 | 414 | 141 | 211 |
| 340 | 519 | 673 | 231 | 309 | 113 | 164 |
| 680 | 373 | 451 | 173 | 226 | 89 | 124 |
| 1700 | 225 | 256 | / | 143 | 65 | 85 |

Example 18

On a blown film extruder, at temperatures from 170–200° C., following ionomers and blends have been produced:

Ionomer G, Ionomer B, Example 4, Example 5 and Example 6. The improved processability of the blends over the individual ionomer components as characterized by their increased Melt indexes can directly be translated into a reduction of the level of the torque on the screw during the blowing operation as can be seen from the Table 7.

The extruded film has a thickness of 50 micron at a blow up ratio of 2.2/1.

TABLE 7

| | Ionomer G | Example 4 | Example 5 | Example 6 | Ionomer B |
|---|---|---|---|---|---|
| W % Zn ionomer | 0 | 25 | 50 | 75 | 100 |
| Molfr Zn | 0 | 0.11 | 0.26 | 0.51 | 1 |
| MI | 0.8 | 1.31 | 1.97 | 3.52 | 0.8 |
| MI Uplift | 100 | 164 | 246 | 440 | 100 |
| Torque (Nm) | 850 | 830 | 770 | 700 | 850 |
| Seal Strength at 90° C. (Mpa) | 4.2 | 8.6 | 10.1 | 17.1 | 5.9 |
| Min. Seal Temp (° C.) (10 MPa) | 96.5 | 93 | 90 | 89 | 95 |

Additionally to the processability improvement, the film offers a drastic improvement of the sealing properties as characterized by the sharp increase in seal strength and the decrease of the minimum seal temperature as shown in Table 7.

Figure 2:
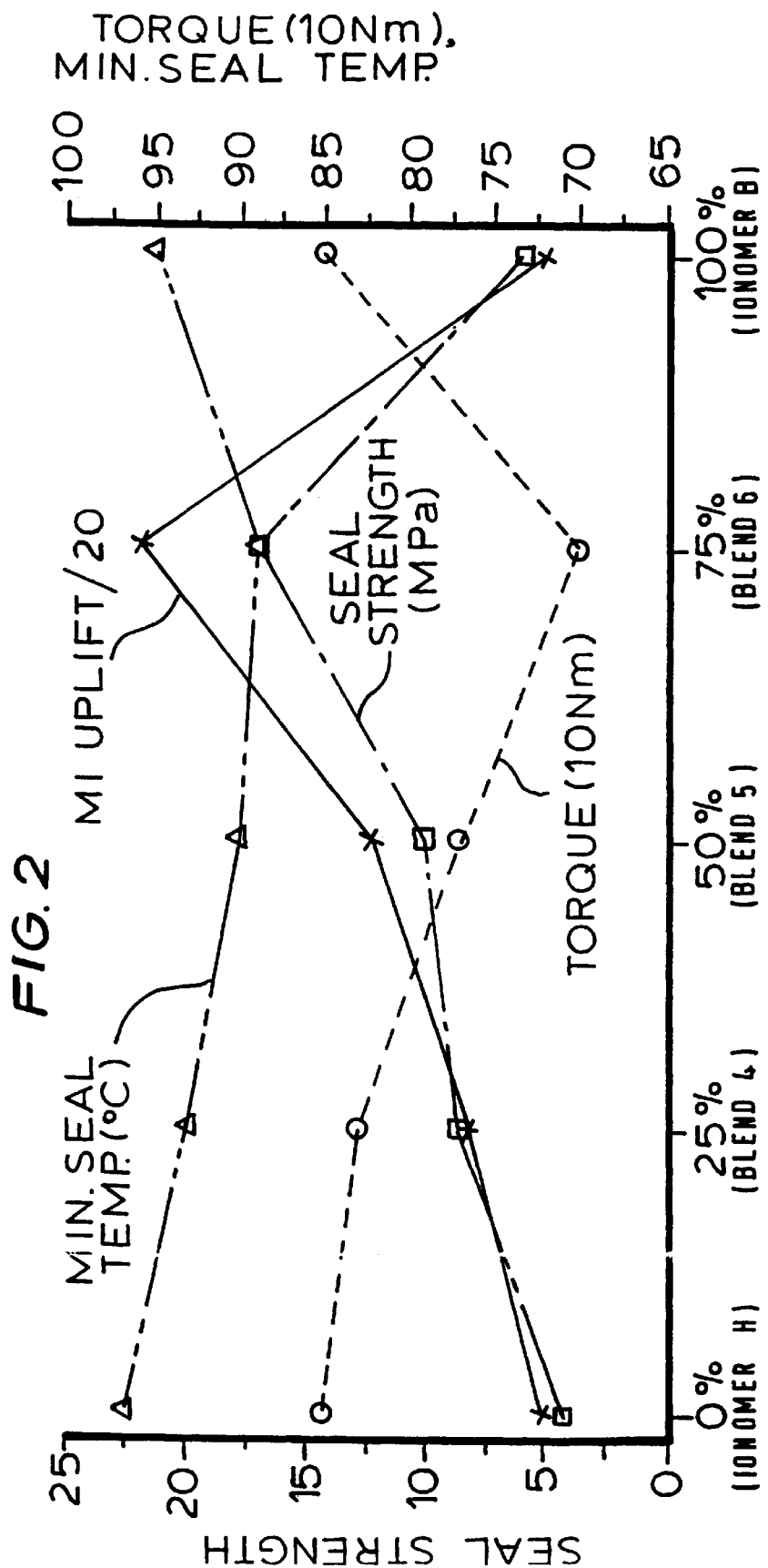

The results are summarised in FIG. 2 where the horizontal axis shows the percentage of ionomer B in different blend ratio's with ionomer H.

Example 19

On a twin screw reactor extruder, at a temperature of 200–250° C., both 0.77 wt % of zinc cation and 0.27 wt % of sodium cation have been added to polymer M in successive stages of an extruder reactor. The characterisation details of the resulting ionomer composition are presented in Table 8.

TABLE 8

| | Determination of MI uplift for PM Examples | Blend Ex. 19 |
|---|---|---|
| 1A | w % Na in composition | 0.27 |
| 1B | w % Zn in composition | 0.77 |
| 1C | w fraction Na in composition | 0.260 |
| 1D | w fraction Zn in composition | 0.740 |
| 2A | MI ionomer composition | 3.2 |
| 2B | Moisture level in ionomer composition | <500 ppm |
| 4 | Acrylic acid level (AA % tot) | 11 |
| 5 | Neutralization degree for Zinc (%) | 15.2 |
| 6 | MI Precursor | 8 |
| 7 | Molfraction Zinc molfr Zinc | 0.50 |
| 8 | MI Uplift Determination: | |
| 8A | weight fraction of Na base ionomer | 0.260 |
| 8B | weight fraction of Zn base ionomer | 0.740 |
| 8C | w % Na in Na base ionomer | 1.040 |
| 8C | w % Zn in Zn base ionomer | 1.040 |
| 8D | MI Na base ionomer | 0.81 |
| 8E | MI Zn base ionomer | 2.13 |
| 8F | MI Uptift | 193 |

The data from the table show that this ionomer composition corresponds to a combination of two base ionomers which have a Melt Index far below the value acceptable for the extrusion coating application type. The ionomer composition which results has an optimum melt index for extrusion coating applications.

Example 20

The Melt Index uplift effect, applied for Zinc and Sodium containing ionomers based upon Zn and Na base ionomers with a very low MI (<0.5 or <2.5), can be exploited in two different ways:
A. Use of the novel effect to achieve properties not achievable with conventional ionomers:
  In Table 9, the Tensile strength as determined according to ASTM D 638 of the ionomer of Example 7 is compared with the tensile strength of Na and Zn EAA and EMAA ionomers of comparable MI, based upon precursors with comparable MI and (M)AA content:

TABLE 9

| | Example 7 | Ionomer B | Ionomer E | Ionomer G | Ionomer K |
|---|---|---|---|---|---|
| Tensile Strength (MPa) | 36 | 24.5 | 24 | 33 | 32 |
| Precursor Type | EAA | EAA | EMAA | EAA | EMAA |
| Cation(s) | Na + Zn | Zn | Zn | Na | Na |

The Tensile strength was determined on 2 mm thick compression moulded plaques, according to ASTM 638.
  The tensile strength as shown by the ionomer in Example 7 is clearly higher than for an ionomer of comparable Melt index and comparable precursor charateristics.
B. The effect can also be used to produce ionomers showing properties which were only obtainable at much lower Melt Index:
  Table 10 shows the comparison of a set of properties of the ionomer of Example 9 with those of ionomer G. The tensile properties were determined according to ASTM 638, the Vicat softening point is determined according to ASTM D1525. Hardness shore D was determined according to ASTM D2240 and the Flexural modulus was determined according to ASTM D790.

All properties have been determined on compression moulded plaques of 2 mm thickness, excepted for the Flexural modulus, which was determined using plaques with a thickness of 3 mm.

TABLE 10

|  |  | Example 9 | Ionomer G |
|---|---|---|---|
| Melt Index | (g/10 min) | 1.93 | 0.8 |
| Tensile Strength | (MPa) | 33.5 | 33 |
| Yield Strength | (MPa) | 19 | 19 |
| Elongation at Break | (%) | 360 | 370 |
| 1% Secant Modulus | (MPa) | 280 | 280 |
| Vicat Softening Point | ° (C.) | 56 | 54 |
| Hardness Shore D |  | 60 | 60 |
| Flexural Modulus | (MPa) | 320 | 320 |

The results in this table clearly show that the ionomer in Example 9 has the same properties as ionomer G, but that these properties are reached at a much higher Melt Index value.

Example 21

Abrasion resistance is another property which illustrates very clearly the two ways of exploiting the melt index uplift effect as described Example 20.

Table 11 gives the Abrasion resistance data (ASTM D 1242) obtained for a series of ionomers based upon an E.AA precursor of MI 36 g/l10 min. with 15 wt % AA.

Polymers Example 21A (ND Zinc: 32.6; molfraction zinc: 0.41; MI uplift: 590) and Example 21B (ND Zinc: 25.2; molfraction zinc: 0.42; MI uplift: 430) have been prepared according to the method explained in detail in Example 19.

TABLE 11

| Polymer | Abrasion Resistance (mm³, Volume loss) | Ionomer Melt Index (g/10 min.) |
|---|---|---|
| Ionomer G | 20.0 | 0.8 |
| Ionomer B | 21.5 | 0.8 |
| Example 21A | 10.0 | 0.8 |
| Example 21B | 19.5 | 2.2 |

The comparison of the single cation ionomers with Example 21 A illustrates the first manner of exploitation: at the same MI value, the polymer from the Example offers a drastically improved abrasion resistance.

The comparison of the single cation ionomers with Example 21 B illustrates the second manner of exploitation: the polymer showing the melt index uplift effect yields the same abrasion resistance already at a much higher Melt Index.

Example 22

A part from the improvements already described, the melt index uplift effect can also be used to improve the problems related to the tendency of ionomers to stick to metal parts of processing and conversion equipment. The sticking to metal decreases with increasing neutralisation degree.

Ultra high neutralisation degrees can be reached by the application of the melt index uplift effect, as shown for some example polymers in Table 12.

The polymers have been prepared according to the method described in Example 19.

TABLE 12

|  | Example 22 A | Example 22 B |
|---|---|---|
| Precursor MI (g/l0 min.) | 100 | 415 |
| Total AA (W %) | 11 | 20 |
| Molfraction Zn | 0.47 | 0.52 |
| Neutralisation Degree Zinc | 50% | 43% |
| MI uplift | 2800 | 2795 |
| Overall Neutralisation Degree | 78% | 63.5% |
| Melt Index (g/10 min.) | 1.0 | 1.2 |

These polymers combine very high neutralisation degrees with good Melt index values.

Example 23

The polymer of Example 19 has been examined for its characteristics as a sealing layer to yield an easy-peel package for e.g. cereals.

Its has therefore been coextruded with HDPE (thickness ratio ionomer/HDPE: 0.10–0.25) under addition of the appropriate levels of slip and anti block agents and colouring agent.

Table 13 shows the seal strength of this structure compared with a similar structure based upon a pure zinc ionomer (MI: 3 g/10 min., 11% AA, 0.7% Zn) and with a market sample of a cereal packaging structure.

TABLE 13

| | Seal Strength (N/15 mm) | | |
|---|---|---|---|
| Seal Temperature (° C.) | Example 19 | Pure zinc ionomer | Market sample |
| 90 | 4.7 | 2.6 | 2.1 |
| 95 | 4.7 | 3.9 | 2 |
| 100 | 4.3 | 2.6 | 1.8 |
| 105 | 3.8 | 2 | 1.7 |
| 110 | 2.9 | 1.8 | 1.4 |

The structure based upon Example 19 offers a higher seal strength than the references over the complete temperature range while still maintaining an excellent peelability.

Also it offers a nearly constant seal strength over broad temperature ranges.

We claim:

1. An ionomer composition comprising a polymer derived from ethylene and at least 5 wt % of acrylic acid, said polymer neutralised by a divalent cation (D) and a monovalent cation (M) at a mol ratio D/(D+M) of from 0.3 to 0.8 with at least 26 mol % of the acrylic acid derived acid groups neutralised by the divalent cation so as to provide a melt index uplift to said polymer of at least 250%.

2. An ionomer composition comprising a polymer derived from ethylene and at least 10 wt % of acrylic acid neutralised by a divalent cation (D) and a monovalent cation (M) at a mol ratio D/(D+M) of from 0.3 to 0.8 with at least 23 mol % of the acrylic acid derived acid groups neutralised by the divalent cation so as to provide a melt index uplift of at least 250%.

3. An ionomer composition comprising a polymer derived from ethylene and at least 5 wt % of acrylic acid neutralised by a divalent cation (D) and a monovalent cation (M) at a mol ratio D/(D+M) of from 0.3 to 0.8 with at least 23 mol % of the acrylic acid derived acid groups neutralised by the divalent cation so as to provide a melt index uplift of at least 250%, said ionomer composition containing less than 10 wt % of an acrylic acid ester.

4. An ionomer composition according to claim 1 wherein said polymer is neutralised to an equivalent extent by a cation selected from the group consisting of a monovalent cation and a divalent cation has a melt index in excess of 0.7.

5. An ionomer composition comprising a polymer derived from ethylene and at least 5 wt % of acrylic acid, said polymer neutralised by a divalent cation (D) and a monovalent cation (M) at a mol ratio D/(D+M) of from 0.1 to 0.9 with at least 10 mol % of the acrylic acid derived acid groups neutralised by the divalent cation, to an equivalent extent by the monovalent cation alone or the equivalent polymer neutralised to an equivalent extent by the divalent cation alone having a melt index of less that 2.5 so as to provide a melt index uplift to said polymer of at least 150%.

6. An ionomer composition according to any one of claims 1, 2, 3 or 5 in which the divalent cation is zinc and the monovalent cation is sodium; the polymer has at least 10% of acrylic acid; the mol ratio D/(D+M) is from 0.4 to 0.7.

7. The ionomer composition of claim 5 wherein at least 25 mol % of the acrylic acid derived groups are neutralized by the divalent cation.

8. A process for preparing an ionomer composition comprising:
   a) neutralizing at least a first polymer component; optionally
   b) blending a second polymer component with said first polymer component, said neutralization is by a divalent cation (D) and a monovalent cation (M) said neutralisation being selected from the group consisting of simultaneous neutralization and sequential neutralization said cations having a mol ratio D/(D+M) of from 0.1 to 0.9 with at least 10 mol % of the acrylic acid derived groups neutralised by the divalent cation; and c) yielding an ionomer composition derived from ethylene and at least 5 wt % of acrylic acid neutralised; having a melt index uplift of at least 150%.

9. The ionomer composition of any one of claims 1, 2, 3, or 5, having a melt index uplift of at least 300%.

10. The ionomer composition of claim 3 wherein said composition contains less than 8 wt % of said acrylic acid ester.

11. The ionomer composition of claim 5 wherein said equivalent polymer has a melt index less than 0.7.

12. The ionomer composition of claim 9 wherein said melt index uplift is at least 350%.

13. The ionomer composition of any one of claim 9 wherein said ionomer composition has a neutralization of at least 23%.

14. The ionomer composition of claim 12, wherein said ionomer composition has a neutralization of at least 23%.

* * * * *